(12) United States Patent
Hanka

(10) Patent No.: US 9,712,328 B2
(45) Date of Patent: Jul. 18, 2017

(54) COMPUTER NETWORK, NETWORK NODE AND METHOD FOR PROVIDING CERTIFICATION INFORMATION

(71) Applicant: EADS Deutschland GmbH, Ottobrunn (DE)

(72) Inventor: Oliver Hanka, Munich (DE)

(73) Assignee: EADS DEUTSCHLAND GMBH, Ottobrunn (DE)

( * ) Notice: Subject to any disclaimer, the term of this patent is extended or adjusted under 35 U.S.C. 154(b) by 179 days.

(21) Appl. No.: 14/307,654

(22) Filed: Jun. 18, 2014

(65) Prior Publication Data
US 2014/0380042 A1 Dec. 25, 2014

(30) Foreign Application Priority Data

Jun. 19, 2013 (DE) .................. 10 2013 010 171

(51) Int. Cl.
*H04L 29/06* (2006.01)
*H04L 9/32* (2006.01)
*H04B 7/185* (2006.01)

(52) U.S. Cl.
CPC ............ *H04L 9/3263* (2013.01); *H04L 9/321* (2013.01); *H04L 9/3268* (2013.01);
(Continued)

(58) Field of Classification Search
CPC . H04L 63/0823; H04L 63/107; H04L 9/3263; H04L 9/3268; H04L 9/321;
(Continued)

(56) References Cited

U.S. PATENT DOCUMENTS 6,035,402 A * 3/2000 Vaeth et al. ............ 726/2
8,589,020 B1 * 11/2013 Angus ................ G06F 11/3006
701/29.1
(Continued)

FOREIGN PATENT DOCUMENTS

WO   2008/018902 A2   2/2008

OTHER PUBLICATIONS

The German Office Action for the corresponding German patent application No. 10 2013 010 171.9, issued on Mar. 10, 2014.
(Continued)

*Primary Examiner* — Eleni Shiferaw
*Assistant Examiner* — Nelson Giddins
(74) *Attorney, Agent, or Firm* — Global IP Counselors, LLP

(57) ABSTRACT

A computer network for data transmission between network nodes, the network nodes being authenticatable to one another by authentication information of a public key infrastructure, with a root certificate authority configured to generate the authentication information for the public key infrastructure. The root certificate authority is arranged separate from the computer network and is not linked to the computer network. A network node of the computer network comprises an authentication information storage, a processor, a network communication device and an initialization device having an initialization communication device and a temporary authentication information storage that can be read out by the processor.

16 Claims, 2 Drawing Sheets

(52) U.S. Cl.
CPC ........ *H04L 63/0823* (2013.01); *H04L 63/107*
(2013.01); *H04B 7/18506* (2013.01); *H04L*
*2209/84* (2013.01)

(58) Field of Classification Search
CPC ..... H04L 9/3281; H04L 9/3247; H04L 9/006;
H04L 29/06775; H04L 2209/84; G06F
21/33; H04B 7/18506; H01Q 1/28
See application file for complete search history.

(56) References Cited

U.S. PATENT DOCUMENTS

| | | | | |
|---|---|---|---|---|
| 2004/0128504 | A1* | 7/2004 | Kivinen et al. ............... | 713/158 |
| 2007/0210162 | A1* | 9/2007 | Keen et al. ................... | 235/451 |
| 2007/0214357 | A1* | 9/2007 | Baldus et al. ................ | 713/157 |
| 2008/0046962 | A1* | 2/2008 | Yukawa .................. | H04L 63/08 |
| | | | | 726/1 |
| 2008/0052517 | A1* | 2/2008 | Anstey .................... | H04L 63/10 |
| | | | | 713/176 |
| 2011/0087882 | A1* | 4/2011 | Kuo et al. .................... | 713/156 |
| 2011/0099371 | A1* | 4/2011 | Roy ...................... | H04L 63/126 |
| | | | | 713/168 |
| 2011/0185183 | A1* | 7/2011 | Yamamoto .................... | 713/182 |
| 2011/0195656 | A1* | 8/2011 | Owyang ............... | H04W 64/00 |
| | | | | 455/3.01 |
| 2013/0132548 | A1* | 5/2013 | Cabos ..................... | H04L 67/16 |
| | | | | 709/223 |
| 2014/0245391 | A1* | 8/2014 | Adenuga ........................... | 726/3 |
| 2014/0294175 | A1* | 10/2014 | Boloker et al. ................. | 380/30 |
| 2014/0309870 | A1* | 10/2014 | Ricci ..................... | H04W 48/04 |
| | | | | 701/36 |
| 2014/0337616 | A1* | 11/2014 | Kimberly ................ | G06F 21/57 |
| | | | | 713/156 |
| 2014/0337630 | A1* | 11/2014 | Kimberly ............. | H04L 9/3281 |
| | | | | 713/176 |

OTHER PUBLICATIONS

The European Search Report for the corresponding European application No. 14171554.0, issued on Nov. 3, 2014.

* cited by examiner

COMPUTER NETWORK, NETWORK NODE AND METHOD FOR PROVIDING CERTIFICATION INFORMATION

CROSS-REFERENCE TO RELATED APPLICATION

This application claims priority under 35 U.S.C. §119(a) to German Patent Application No. 10 2013 010 171.9, filed on Jun. 19, 2013, the entire contents of German Patent Application No. 10 2013 010 171.9 are hereby incorporated herein by reference.

BACKGROUND

Field of the Invention

The invention relates to a computer network for data transmission between network nodes, the network nodes being authenticatable to one another by means of authentication information of a PKI. A root certificate authority is configured for generating the authentication information for the PKI. Furthermore, the invention relates to a network node for such a computer network with an authentication information storage unit, a processing device and a network communication device. The invention also relates to a method for authenticating such a network node to such a computer network, wherein the authentication information has a key information assigned to the network node and a signature information, and wherein a signature information is generated from a key information and a root key information assigned to the root certification authority.

Background Information

The central element of a public key infrastructure (PKI) is the root certificate authority (RootCA), which issues certificates and keeps certification revocation lists (CRL, revocation information list) up-to-date. This functionality usually requires a link of the network to the RootCA. In the case of an onboard solution, for example in an aircraft, specific problems occur. A RootCA, which itself has access to the on-board network, is possibly exposed to attackers. In order to achieve a sufficient level of security, an elaborate and expensive safeguard of the RootCA, for example in the form of a firewall, is used.

Moreover, for the purpose of changes, for example in order to issue a certificate, revoke a certificate or to change the certificate revocation lists, there has to be a link to the RootCA in a conventional PKI infrastructure. This may not always be possible in the case of airplanes, particularly in flight or on the ground in an untrustworthy environment.

SUMMARY

An object of the invention is to manage authentication information of a PKI environment in an aircraft in a simple and secure manner.

Thus, the disclosed embodiments provide a computer network, a network node for the computer network, and a method for authenticating the network node to the computer network as described herein.

The computer network according to the invention is advantageous in that a firewall for safeguarding the root certificate authority can be omitted. Thus, both the weight and the energy consumption of the computer network are reduced.

The root certificate authority can be disposed in a first region with limited physical access. By simple construction measures, such as they already exist in an aircraft, such an access to the computer network can be limited. If a network node has no physical access to the first region, and thus to the root certificate authority, it will not obtain access to the computer network as such.

The root certificate authority can have a wireless short-distance data transmission device with a communication range that does not extend beyond the first region. Thus, a simplified wireless communication is possible, but it is efficiently limited to communication partners which have access to the secured region and which are thus accorded a position of trust.

The network node according to the invention permits the transfer, prior to its final installation in or on the aircraft, of authentication information by means of the initialization communication device and storing this information until the start of operation. The incorporation of the network node into the computer network then only requires that the former is brought once into the limited-access region prior to its installation and/or start of operation.

The temporary authentication information storage unit of the network node can be configured in such a way that is exclusively writable by the initialization communication device. It thus becomes impossible to read out the authentication information by means of the initialization communication device, for example because of a software fault.

The initialization device can be configured so as to be destructible by the processing device, so that a removal of the authentication information from the network node is effectively prevented.

The network node can comprise a revocation list storage device. It is thus no longer necessary to maintain a direct link to the root certificate authority in order to have access to revocation information lists.

Advantageously, the initialization device is externally supplied with power, so that it requires no power source of its own for the transfer of the authentication information.

The network node can be configured as an access point for a WLAN. In that case, such an access point can decide on granting access to the WLAN based on the authentication information and/or the revocation information lists.

The method according to the invention permits logging a network node into a computer network, or to transmit to the network node authentication information for the computer network, without the computer network being directly linked to the root certificate authority provided for this purpose.

The method can provide destroying the initialization device. Security is thus further enhanced.

Advantageously, the authenticity of authentication information sent from another network node is verified based on the authentication information stored in the authentication information storage unit. If the verification fails, i.e. if the authentication information cannot be successfully verified, then communication is denied. It is thus ensured that communication is carried out only with such network nodes that were brought into the limited-access region and were authenticated correctly therein.

In an advantageous embodiment of the method, a revocation information list is transmitted together with the authentication information to the initialization device and then stored in the temporary authentication information storage unit. Upon the start of operation of the network node, the revocation information list is transferred into the authentication information storage unit and distributed via the computer network to other network nodes. It is therefore no longer necessary to have direct access to the root certificate authority for accessing the revocation information list.

If a revocation information list is provided, the authenticity of authentication information sent from another network node is, advantageously, additionally checked as to whether the authentication information is contained in the revocation information list. If the authentication information is contained in the revocation information list, the communication process is denied.

DESCRIPTION OF THE DRAWINGS

The invention is explained below in more detail with reference to an exemplary embodiment that is schematically depicted in the attached Figures. In detail.

DETAILED DESCRIPTION OF EMBODIMENTS

Figure 1:
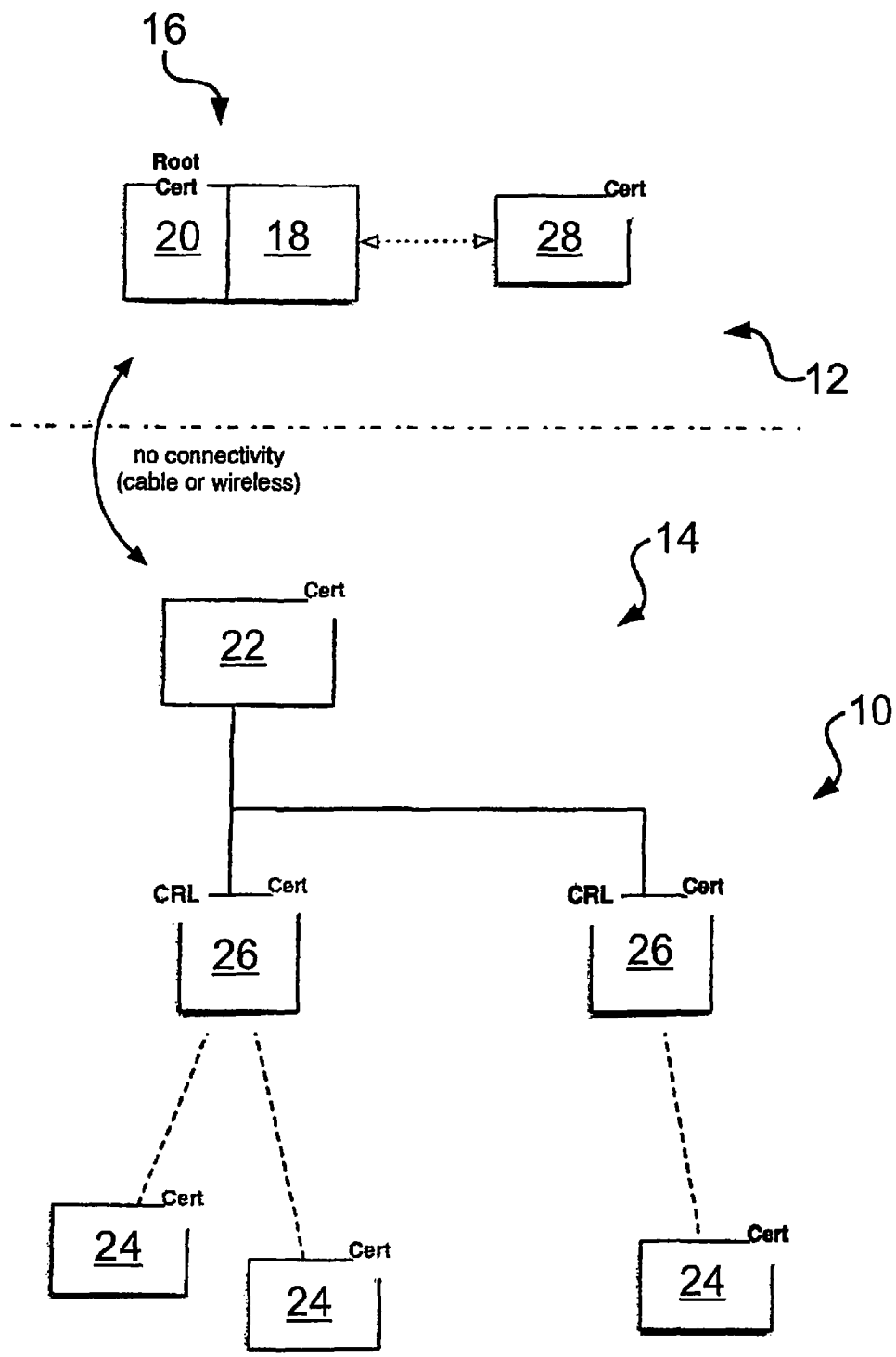
FIG. 1 shows a structure of an embodiment of the computer network.

FIG. 1 shows a computer network 10 as well as a limited-access first region 12 assigned to the computer network 10, the computer network 10 having a public second region 14.

A root certificate authority 16 also referred to as RootCA is disposed in the first region 12. The RootCA 16 has a communication device 18 configured as a wireless short-distance data transmission device. For wireless communication, the communication device 18 thus only has a near field which in this case is configured as an RFID. Thus, the communication device 18 has a very limited communication range that does not extend beyond the first region 12.

The RootCA 16 has a signing device 20 in which a root key information is stored in such a way that it cannot be read out from outside. By means of the root key information, the signing device 20 is capable of digitally providing digital information with a signature information in such a way that its authenticity is ensured.

A plurality of network nodes 22, 24, 26 interlinked with each other is disposed in the second region 14. The network node 22 is linked by means of a cable-based connection to the network nodes 26 that are configured as wireless access points for a WLAN. The network nodes 24 are wirelessly linked to the access points 26 via the WLAN.

Each of the network nodes 22, 24, 26 has as authentication information a certificate (cert) that serves for authentication with respect to the other network nodes 22, 24, 26. In a typical PKI as it is provided in the embodiment presently described, the authentication information has a private key information, a public key information as well as the signature information prepared by the RootCA 16 or its signing device 20.

In order to verify the authenticity of the authentication information provided by the other network nodes 22, 24, 26, the network nodes 24, 24, 26 can have a certificate from the RootCA 16. In addition to their certificate, the access points 26 have a certificate revocation list (CRL) in which it is stored which authentication information was revoked by the RootCA 16 and is therefore invalid. If a network node 22, 24, 26 attempts to log on to the access point 26 with such an authentication information, it is denied the connection. If a network node 22, 24, 26 receives messages from another network node 22, 24, 26 that are not accompanied by a valid authentication information, then these messages can be discarded.

In order to be able to connect a new network node 28 with the computer network 10, the new network node 28 requires a valid authentication information. Because the RootCA 16 is not linked to the computer network 10, the new network node 28 is unable to obtain this authentication information via the computer network 10.

Figure 3:
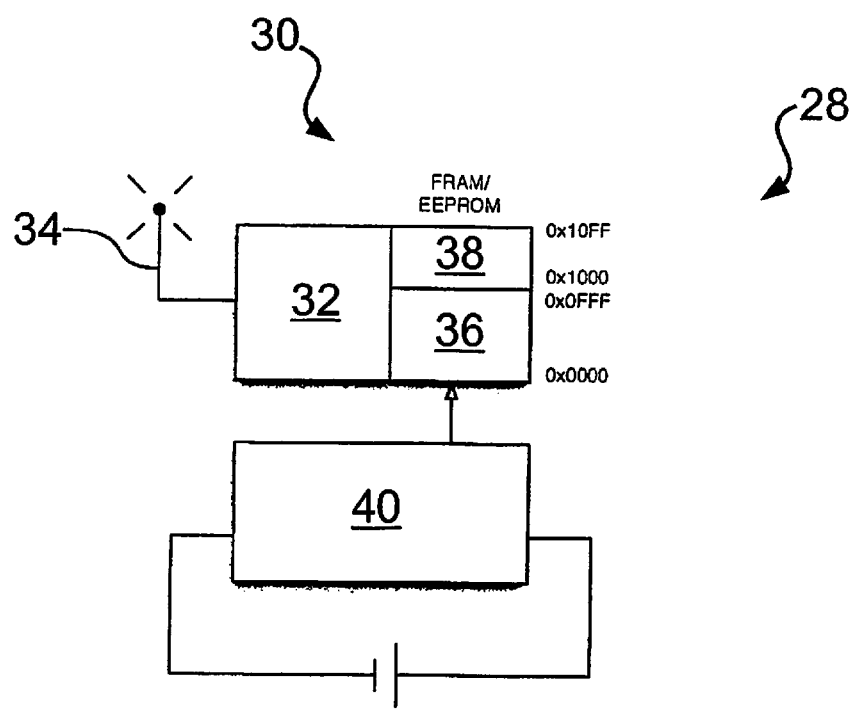
FIG. 3 shows a detailed view of a network node.

Before the new network node 28 is allowed access to the computer network 10, proof is to be furnished that the new network node 28 or its user has access authorization. In order to transfer the authentication information, the network nodes 22, 24, 26, 28, as is shown in FIG. 3 by way of example for a new network node 28, have an initialization device 30. The following description of the new network node 28 can applied in the exact same manner to the network nodes 22, 24, 26.

The initialization device 30 has an initialization communication device 32 with an RFID antenna 34. The initialization communication device 32 is configured as an externally power-supplied RFID receiver and requires no power supply of its own because the operating power is provided by the associated transmitter, in this case the communication device 18.

In addition, the initialization device 30 has a temporary authentication information storage unit 36. The initialization communication device 32 exclusively has write access to the temporary authentication information storage unit 36, in which it can store authentication information received from the communication device 18 of the RootCA 16. It is thus excluded that authentication information stored in the temporary authentication information storage unit 36 is read out by means of the initialization communication device 32. In addition, the initialization device 30 can also have working memories 38 to which the initialization communication device 32 has both write and read access.

The network node 28 has a processing device 40 with its own authentication information storage unit and a network communication device. The initialization device 30 and the processing device 40 are functionally independent from each other. However, the processing device 40 is able to read-access the temporary authentication information storage unit 36. When the operation of the processing device 40 is started and it does not find any authentication information in its authentication information storage unit, it checks whether the temporary authentication information storage unit 36 contains authentication information. If that is the case, the authentication information is copied from the temporary authentication information storage unit 36 into the authentication information storage unit of the processing device 40. Then, the processing device 40 is able with its own network communication device to establish an authenticated link to the other network nodes 22, 24, 26, 28.

Figure 2:
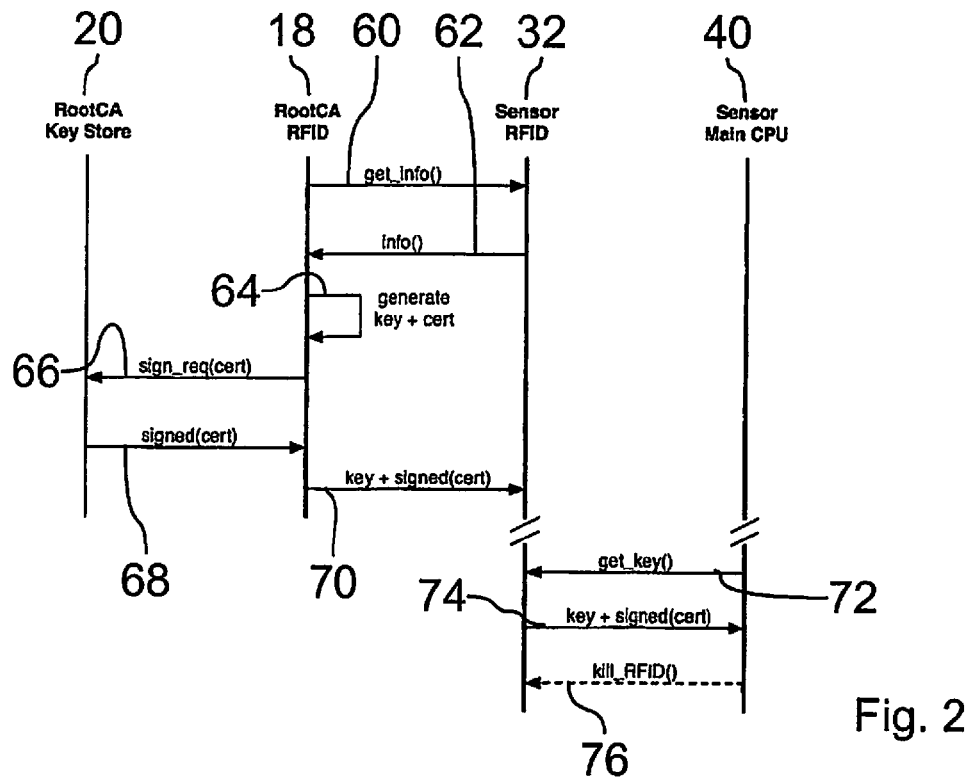
FIG. 2 shows a message transmission diagram.

A method by means of which the new network node 28 is able to obtain valid authentication information is shown schematically in FIG. 2. In a first step 60, the communication device 18 requests from the initialization communication device 32 information on the new network node 28.

In a second step 62, the initialization communication device 32 transmits this information to the communication device 18. In a third step 64, the communication device 18 generates key information as well as certificate information. In a fourth step 66, the key information and certificate information are transmitted to the signing device 20 for signing.

In a fifth step 68, the signing device 20 signs the key information and certificate information. The signed key information and certificate information together form the authentication information for authentication to other network nodes 22, 24, 26, 28. The signing device 20 transmits this information to the communication device 18, which in turn transmits the authentication information in a sixth step 70 to the initialization communication device 32.

Thereupon, the initialization communication device 32 stores the authentication information in the temporary authentication information storage unit 36. The processing device 40 of the new network node 28 need not have been switched on yet at this point in time. Therefore, the entire process may proceed completely without the processing device 40.

If the processing device 40 is switched on, then it requests in a seventh step 72 the authentication information from the temporary authentication information storage unit 36 of the initialization communication device 32 and receives it in an eighth step 74.

It can be provided that the processing device 40 in a ninth step 76 transmits a command to the initialization communication device 32 which leads to the initialization communication device 32 destroying itself and, above all, the temporary authentication information storage unit 36.

For authentication, the computer network 10 thus uses an onboard PKI with a certificate authority/RootCA 16 separated from the network. The root certificate is protected against being read out. In particular, it cannot be read out through the computer network 10. The authentication information, for example in the form of a certificate, and revocation information list/CRLs are transmitted via a unidirectional out-of-band interface.

The transmission of the certificates and the CRLs requires no power supply of the network nodes 22, 24, 26, 28 of their own. The transmission is locally limited; thus, a physical authentication (access authorization) is caused.

The level of security of the RootCA 16 is higher compared to a solution with a RootCA 16 linked to the network, with lower costs at the same time. Furthermore, the organizing effort for authenticating new network nodes 22, 24, 26, 28 is greatly simplified. No further roles and mechanisms (trust agent or registration authority, for example) are needed in addition to the already existing organizing effort of the physical limitation.

In order to realize the onboard PKI solution, the PKI infrastructure is divided into two regions. The RootCA 16, which is considered the trust anchor for all network subscribers/network nodes 22, 24, 26, 28, is located in a first region 12 with limited physical access, for example in a cockpit of an aircraft. Only persons with access authorization for this first region 12 with limited physical access can directly access the functions of the RootCA 16. All other network components/network nodes 22, 24, 26, 28 are located separate from this in a publicly accessible second region 14. There is no direct communication link between the regions 12, 14, neither cable-based nor via a radio interface.

The RootCA 16 is responsible for issuing new certificates (authentication information) and to maintain an up-to-date certificate revocation list (CRL). All certificates that are no longer valid are recorded on this list. The list can be supplemented by manual input on the RootCA 16 or by automatic processes of the RootCA 16. By signing the most up-to-date list by means of the secret key (root key information) of the RootCA 16, all network subscribers are able to verify the correctness of the CRL.

The private key (root key information) of the RootCA 16, which is required for all functions, is stored in a secure key storage unit. This key storage unit can be realized, for example, as a hardware security module or a smart card. All cryptographic operations that require the use of the private key are carried out by the key storage unit itself. The private key therefore never leaves the key storage unit. This is advantageous in that the private key cannot be read out even in the case of a physical access to the RootCA 16. Particular care can be taken to secure the key storage unit against side channel attacks, as is the case, for example, in smart cards.

If a network subscriber 22, 24, 26, 28 (a sensor node 24, for example) is replaced, then the certificate of the old sensor node 24 is entered into the CRL/revocation information list, and a new certificate is issued for the new sensor node 24, as is shown in FIG. 2.

The communication between the RootCA 16 and the new sensor node 24 is made possible by means of RFID (radio frequency identification). The advantage of this communication method lies in the fact that the sensor node 24 requires no power source of its own for this process but is externally supplied with power by the RootCA 16. The schematic structure of the sensor node 24 is illustrated in FIG. 3. Furthermore, RFID can be used as an ultra-short distance radio technology. This means that the communication cannot be monitored or influenced from outside the limited-access first region 12.

In the storage unit of its RFID controller, which in this case forms the initialization device 30, each new sensor node 24 has information about itself in store (for example serial number, device class, etc.) In a first step, this information is read out by the RootCA 16, or its communication device 18. Then, the RootCA 16, particularly its signing device 20, generates a new pair of keys (consisting of a private and a public key), generates a new certificate using the information read out from the sensor, and uses its own private key to sign the certificate. Then, the pair of keys and the certificate, which together form the authentication information, are transmitted back to the sensor by means of RFID. In the process, the RFID controller of the sensor stores the key and the certificate in a storage area/block which the RFID controller can only write into, but not read (write only) (temporary authentication information storage unit 36). In this way, it is impossible to read out the key via RFID.

Then, the sensor node 24 is brought to its actual installation site. Once the sensor node 24 is switched on by its own power supply (battery or cable), it passes through an initialization phase (once). In this phase, the main processor (processing device 40) of the sensor node 24 reads out both the pair of keys and the certificate from the temporary authentication information storage unit 36 of the RFID controller and stores them in its own protected storage unit. Then, depending on a request, a destruction sequence can be transmitted to the RFID controller. Thus, the RFID controller self-destructs and becomes inoperable.

The cryptographic operation of the sensor then runs as in conventional systems. Remote stations (other sensor nodes, access points and other network subscribers, for example) can be identified by their certificates and thus establish trust relationships.

The CRL comes into the active part of the computer network 10 in a similar way as the authentication information. The list signed by the RootCA 16 is transferred by the RootCA 16 onto the RFID controller of a sensor or an RFID module of another network subscriber/network node 22, 24, 26, 28. Once the sensor node 24 or the network subscriber 22, 24, 26, 28 establishes a connection to the computer network 10, the CRL can be distributed to the connected access points 26, for example. During the transmission, the CRL is secured against unnoticed manipulation by means of the attached signature of the RootCA 16.

In this way, the CRL can be updated at any point in time without there being a direct communication link to the RootCA 16. The transmission of the authentication information, of keys, certificates and the CRL takes place via unidirectional out-of-band signaling.

The invention permits the improvement in a simple manner of the security of using a PKI for the authentication of network nodes 22, 24, 26, 28 of a computer network in an aircraft.

What is claimed is:

1. A network node for a computer network for data transmission between network nodes, the network nodes being authenticatable to one another by authentication information of a public key infrastructure, the computer network comprising:

a root certificate authority disposed in a first region with limited physical access disposed within a cockpit of an aircraft, and arranged separate from the computer network without being linked to the computer network, the functions of the root certificate authority are directly accessible to only persons with access authorization for the first region with limited physical access disposed within the cockpit of the aircraft, the root certificate authority comprising:

a signing device configured to generate the authentication information for the public key infrastructure, and a wireless short-distance data transmission device with a communication range that does not extend beyond the first region, the wireless short-distance data transmission device communicating with the network node while the network node is within the communication range that does not extend beyond the cockpit; and the network node comprising: an authentication information storage; a processor; a network communication device; and an initialization device including an initialization communication device and a temporary authentication information storage, the processor being configured to read information from the temporary authentication information storage.

2. The network node according to claim 1, wherein the temporary authentication information storage is writable by the initialization communication device.

3. The network node according to claim 1, wherein the initialization device is configured to be destroyed by the processor.

4. The network node according to claim 1, further comprising
a revocation list storage.

5. The network node according to claim 1, wherein the initialization device is configured to receive power from an external source.

6. The network node according to claim 1, wherein the network node is configured as an access point for a WLAN.

7. The network node according to claim 1, wherein the network node is configured as the access point for the WLAN that is disposed in second region outside of the first region.

8. A method for authenticating a network node of a computer network, the method comprising:

providing a root certificate authority disposed in a first region with limited physical access disposed within a cockpit of an aircraft, and arranged separate from the computer network and without being linked to the computer network, wherein the functions of the root certificate authority are directly accessible to only persons with access authorization for the first region with limited physical access disposed within the cockpit of the aircraft, the root certificate authority comprising a signing device configured to generate authentication information for the public key infrastructure and a wireless short-distance data transmission device with a communication range that does not extend beyond the first region, the authentication information including key information assigned to the network node and signature information, and the network node comprising an authentication information storage, a processor, a network communication device and an initialization device including an initialization communication device and a temporary authentication information storage, the processor of the network node being configured to read information from the temporary authentication information storage;

operating the signing device to generate the signature information from the key information and the root key information assigned to the root certification authority;

operating the wireless short-distance data transmission device to wirelessly transmit the authentication information formed from the key information and the signature information to the initialization communication device of the network node while the network node is in the first region within the communication range that does not extend beyond the cockpit;

storing the authentication information in the temporary authentication information storage;

connecting the network node to the computer network; and transferring the authentication information from the temporary authentication information storage into the authentication information storage.

9. The method according to claim 8, further comprising destroying the initialization device.

10. The method according to claim 9, further comprising transmitting a revocation information list to the initialization device;

storing the revocation information list in the temporary authentication information storage;

transferring the revocation information list into the authentication information storage; and transmitting the revocation information list to other network nodes via the computer network.

11. The method according to claim 9, further comprising verifying the authenticity of authentication information sent from another network node based on the authentication information stored in the authentication information storage; and denying a communication process with the another network node when the verifying is unable to verify the authenticity of the authentication information sent from the another network node.

12. The method according to claim 11, further comprising transmitting a revocation information list to the initialization device;

storing the revocation information list in the temporary authentication information storage;

transferring the revocation information list into the authentication information storage; and transmitting the revocation information list to other network nodes via the computer network.

13. The method according to claim 8, further comprising verifying the authenticity of authentication information sent from another network node based on the authentication information stored in the authentication information storage; and denying a communication process with the another network node when the verifying is unable to verify the authenticity of the authentication information sent from the another network node.

14. The method according to claim 8, further comprising transmitting a revocation information list to the initialization device;

storing the revocation information list in the temporary authentication information storage;

transferring the revocation information list into the authentication information storage; and transmitting the revocation information list to other network nodes via the computer network.

15. The method according to claim 14, further comprising comparing the authentication information with the revocation information list and denying a communication process with another network node upon determining that the authentication information sent from the another network node is contained in the revocation information list.

16. The method according to claim 8, wherein the computer network is disposed in a second region outside of the first region; and the connecting connects the network node to the computer network when the network node is in the second region.

\* \* \* \* \*